United States Patent [19]

Georger et al.

[11] Patent Number: 5,367,273

[45] Date of Patent: Nov. 22, 1994

[54] ADAPTER FOR VIDEO AND AUDIO TRANSMISSION

[75] Inventors: William H. Georger, Dover Township, Ocean County; John A. Rutkowski, Jackson Township, Ocean County, both of N.J.

[73] Assignee: AT&T Corp., Murray Hill, N.J.

[21] Appl. No.: 943,664

[22] Filed: Sep. 11, 1992

[51] Int. Cl.[5] .............................................. H03H 7/00
[52] U.S. Cl. ........................................... 333/1; 333/4; 333/25
[58] Field of Search ................... 333/1, 12, 24 R, 25, 333/26, 4, 5; 336/107; H04N 7/10

[56] References Cited

U.S. PATENT DOCUMENTS

| | | | |
|---|---|---|---|
| 2,099,800 | 11/1937 | Espenschied et al. | 333/5 |
| 4,502,026 | 2/1985 | Imazeki et al. | 333/25 X |
| 4,800,344 | 1/1989 | Graham | 333/25 |
| 4,839,531 | 6/1989 | Stemmons et al. | 333/25 X |
| 5,130,793 | 7/1992 | Bordry et al. | 358/86 |

OTHER PUBLICATIONS

*Systimax ® Premises Distribution System Components Guide*, AT&T Doc. No. 3726C, (Dec. 1990), pp. 3–10.
VIDA Networking Consultants Inc. advertisements available from company and placed in Network World (Mar.–May 1992).

*Primary Examiner*—Paul Gensler
*Attorney, Agent, or Firm*—Lester H. Birnbaum

[57] ABSTRACT

Disclosed is an adapter which permits unbalanced video and audio baseband signals to be transmitted over unshielded twisted pair wiring. The adapter includes low loss transformers which produce a minimum of crosstalk.

7 Claims, 2 Drawing Sheets

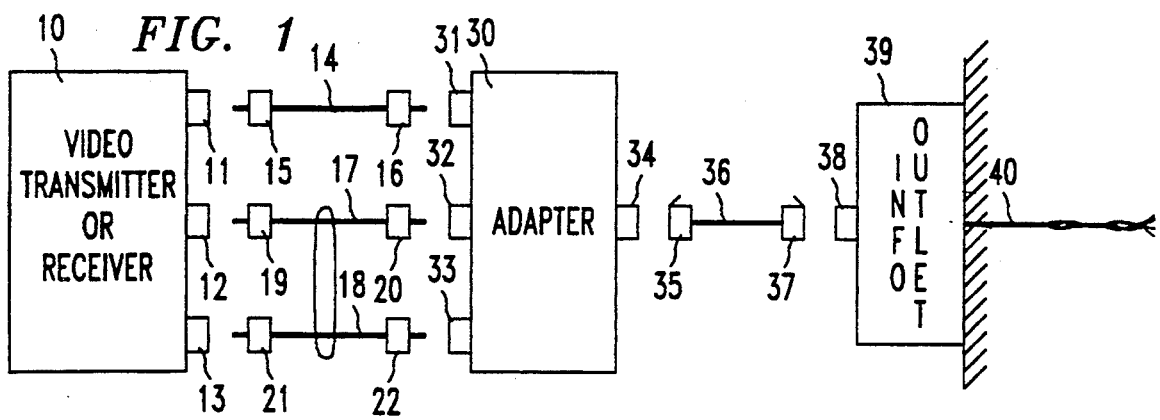
FIG. 1
FIG. 2
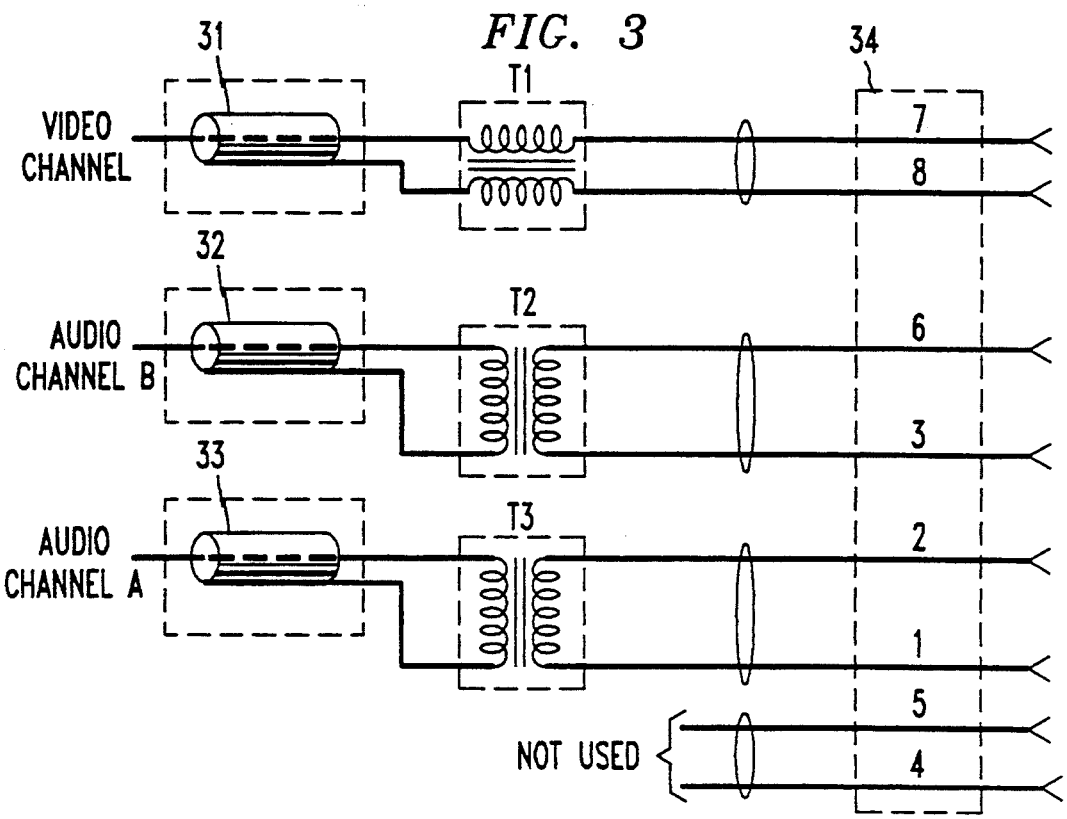
FIG. 3

ADAPTER FOR VIDEO AND AUDIO TRANSMISSION

BACKGROUND OF THE INVENTION

This invention relates to transmission of video and audio baseband signals.

A present and future need exists to bring video and audio signals to the desk, for example, to provide security monitoring, factory production monitoring, training, and video conferencing. Such information needs usually require the installation of shielded wiring or optical fiber cables. It would be more economical to utilize wiring which is already available within the physical structure, i.e., the unshielded twisted pair cables used for transmission of analog voice signals. However, a problem exists in preventing undue crosstalk between the video and audio twisted pairs which are located within the same cable sheath.

Some vendors have suggested applying video and audio signals to twisted pair by means of an active interface which shapes and amplifies the signals (see U.S. Pat. No. 5,130,793 issued to Bordry et al.). However, this approach is expensive. It would be far more economical to provide an adapter which will permit coupling of the video and audio channels in a "passive" rather than an "active" manner.

Further, it does not appear that anyone has suggested the application of dual channel audio signals to twisted pair wiring.

SUMMARY OF THE INVENTION

The invention is a device for applying video and audio signals to a cable including twisted pairs of wires. The device includes first and second ports for coupling the device to a video and at least one audio channel. Each port is coupled to a transformer which has a high degree of balance. A third port is coupled to at least one transformer, the third port being adapted for coupling to twisted pairs of wires.

BRIEF DESCRIPTION OF THE DRAWING

These and other features of the invention are delineated in detail in the following description. In the drawing;

FIG. 1 is a block diagram of a system including the device according to one embodiment of the invention;

FIG. 2 is a schematic diagram of one portion of the device according to the same embodiment;

FIG. 3 is a schematic circuit diagram of the device in accordance with the same embodiment of the invention;

DETAILED DESCRIPTION

Figure 4:
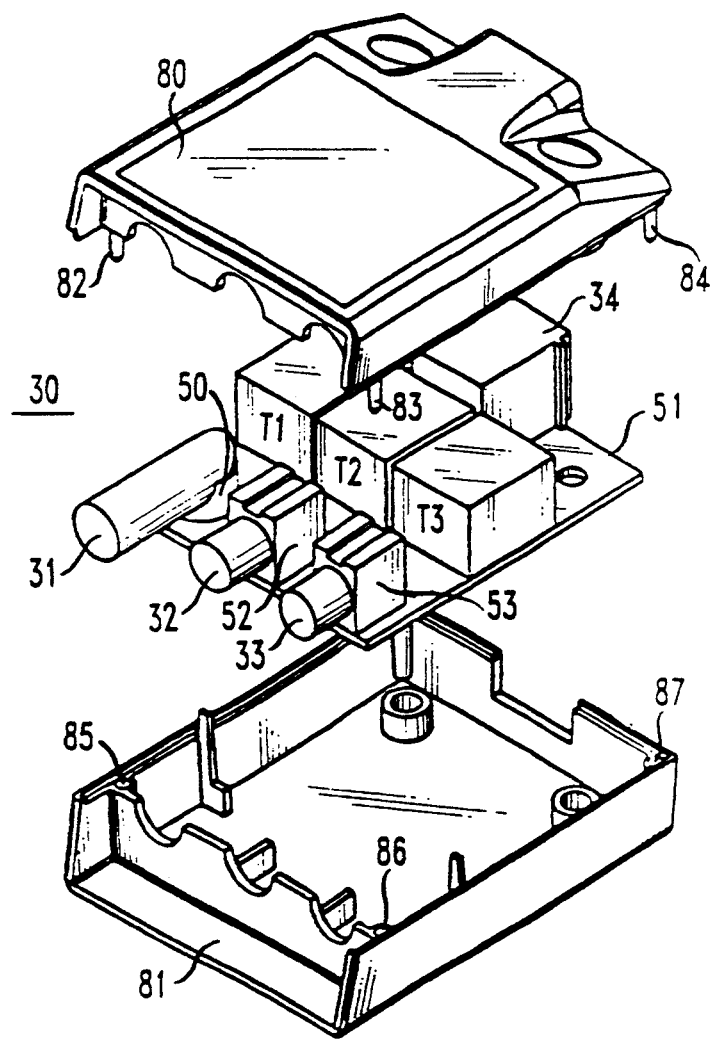
FIG. 4 is an exploded perspective view of a device in accordance with the same embodiment.

FIG. 1 illustrates the use of an adapter to permit transmission of baseband video and audio signals on twisted pairs of wires. A video transmitter or receiver 10 such as a VCR or TV camera includes an input/output for video signals 11 and a pair of inputs/outputs, 12 and 13, for two channel audio signals. The video I/O 11 is electrically coupled to a standard coaxial cable 14 which is terminated by standard BNC plugs 15 and 16. Each audio L/O, 12 and 13, is electrically coupled to a standard audio cable with wires 17 and 18, terminated in standard phono plugs, 19, 20 and 21, 22, respectively.

An adapter 30 includes a first set of ports, 31, 32, 33, which are standard receptacles for receiving and electrically engaging the plugs 16, 20, and 22 of the cables 14, 17 and 18. At the other end of the adapter is an output port, in this example a single modular jack 34, which is adapted for receiving and electrically engaging a standard modular plug 35. That is, the modular jack 34 includes at least three pairs of electrical pins, each pair coupled to one of the input ports, 31–33. In this example, a standard 8-pin modular jack is employed with the pin layout illustrated in FIG. 2. As shown, the first two pins (1 and 2) are used for audio channel "A", while pins 3 and 6 are used for audio channel "B". Pins 7 and 8 are used for the video channel. Pins 4 and 5, normally used for voice transmission, are not used by the adapter. (For an example of a standard 8-pin modular jack, see, Systimax ® Premises Distribution System Components Guide, AT&T Doc. No. 3726C, p. 3–10, [December 1990].)

Cord 36, which can be a standard unshielded twisted pair cord containing at least three twisted pairs, includes a similar plug 37 at the end opposite to the plug 35. The plug 37 mates with a modular jack 38 which is part of the information outlet 39 mounted to the wall of a building. This information outlet couples the video and two audio signals onto separate twisted pairs of a four-pair cable, 40, which runs throughout the building. The information outlet 39 is a standard part of an AT&T Systimax ® Premises Distribution System. (See, for example, Components Guide, cited above.)

In order to permit the audio and video signals to be transmitted over the four twisted pairs which share a common sheath, the adapter 30 is constructed in accordance with the circuit schematic diagram of FIG. 3. Port 31, which receives the video channel signals, comprises, in this embodiment, a standard BNC female coaxial connector, but could be any suitable connector. The signal portion of the connector is coupled to one end of the primary winding of first transformer, $T_1$, while the ground portion of the connector is coupled to one end of the secondary winding of transformer $T_1$. The opposite ends of the windings are coupled to the appropriate pins (7 and 8) of the modular jack 34.

The ports 32 and 33, in this example, comprise standard phone jacks. The signal portion of each jack is coupled to one end of the primary winding of an associated transformer, $T_2$ and $T_3$, while the ground connection of each jack is coupled to the other end of the primary winding of its associated transformer. The secondary windings are coupled to the appropriate pins (6, 3, 2 and 1) of the modular jack 34. As previously mentioned, pins 4 and 5 of modular jack 34 are not used in this embodiment.

The transformers, $T_1$–$T_3$, have certain characteristics to produce low crosstalk between the audio and video signals. A high balance, i.e., tight coupling between the two windings of the transformer, is required. In particular, it is desirable that the video transformer, $T_1$, have a common mode rejection greater than 40 dB for frequencies up to 50 MHz. The audio transformers should have a common mode rejection greater than 40 dB for frequencies up to 100 kHz. This high balance can be achieved, for example, by means of a "bifilar" winding arrangement wherein both primary and secondary windings are wound side by side around a magnetic core. Such a winding minimizes leakage inductance and DC resistance differences between windings in order to allow for the high degree of balance.

A flat frequency response for each transformer is also desirable: to accurately reproduce the video and audio signals at the output port (34) of The adapter. It is, therefore, recommended that the frequency response of the video transformer be within ±0.5 dB in the DC to 8 MHz frequency range, while the frequency response of the audio transformers be within ±0.5 dB in the 50 Hz to 15 kHz frequency range. It is further desirable for the transformers to exhibit low loss to ensure that the video and audio signals are not unduly attenuated. A loss of no greater than 0.5 dB is desirable. In order to achieve such losses, a magnetic core material with a high permeability is recommended for each transformer. In this example a permeability of 20,000 was used, but in general a permeability of greater than 10,000 is desirable.

Figure 5:
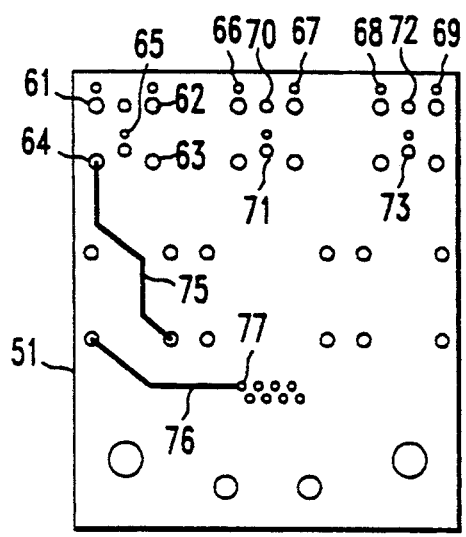
FIG. 5 is a plan view of a portion of the device in accordance with the same embodiment.

FIGS. 4 and 5 illustrate one example of a physical embodiment of the adapter 30. The BNC coaxial connector 31 includes a post 50 which mounts the connector onto a printed circuit board 51 by soldering four legs of the post into holes (61–64 of FIG. 5) in the board. The signal portion of the contact is soldered in hole 65. Phono jacks 32 and 33 are mechanically attached to insulating blocks 52 and 53, respectively, which are snapped into holes (66, 67 and 68, 69, respectively) in the circuit board. Downwardly extending vertical posts (not shown) which are an integral part of the connectors 32 and 33 and couple the ground and signal portions to the board are soldered in holes 70, 71 and 72, 73 respectively, in the circuit board.

It will be noted in regard to FIG. 5 that each mounting position for the contacts includes the same array of nine holes so that the positions and types of contacts can be varied if desired.

Each connector is coupled to its associated transformer ($T_1$–$T_3$) by means of conductive leads, e.g., 75, formed on the bottom surface of the printed circuit board. Each transformer, in turn, is coupled to its associated pins of modular jack 34 by conductive leads, e.g., 76, which are also deposited on the bottom surface of the printed circuit board. The pins of the modular jack 34 are soldered in their respective holes, e.g., 77.

The circuit board 51 and the components mounted thereon are enclosed within a housing formed by two half-shells, 80 and 81, mechanically attached by means of four posts (82–84 being visible) fitted within corresponding holes (85–87 being visible).

It will be appreciated that it should be possible to also include voice signals on one of the twisted pairs within the same sheath as the pairs carrying the voice and audio signals in the cable (40 of FIG. 1)

Various modifications of the invention will become apparent to those skilled in the art. All such variations which basically rely on the teachings through which the invention has advanced the art are properly considered within the scope of the invention.

We claim:

1. A device for applying video and audio baseband signals to a cable including twisted pairs of wires, the device comprising:
   first and second ports for coupling the device to a video and at least one audio channel;
   a first transformer electrically coupled to the first port and a second transformer electrically coupled to the second port, each transformer exhibiting a high degree of balance, the transformer coupled to the video channel having a common mode rejection greater than 40 dB for frequencies up to 50 MHz and the transformer coupled to the audio channel having a common mode rejection greater than 40 dB for frequencies up to 100 kHz; and
   a third port electrically coupled to said transformers, the said port being adapted for electrical coupling to said twisted pairs of wires.

2. The device according to claim 1 further comprising a fourth port for coupling the device to a second audio channel.

3. The device according to claim 2 wherein the third port comprises a modular jack comprising separate pairs of pins coupled to the first, second and fourth ports through a corresponding transformer.

4. The device according to claim 2 wherein the first port and the second and fourth ports comprise connectors of different types mounted to a printed circuit board, the said circuit board including an identical hole pattern at each mounting site to accommodate soldering either connector type at each site.

5. The device according to claim 1 wherein the frequency response of the transformer coupled to the video channel is within ±0.5 dB in the frequency range DC to 8 MHz, and the frequency response of the transformer coupled to the audio channel is within ±0.5 dB in the frequency range 50 Hz to 15 kHz.

6. The device according to claim 1 wherein each transformer has a magnetic core with a permeability of at least 10,000.

7. The device according to claim 1 wherein the transformers have a bifilar winding arrangement.

* * * * *